(12) United States Patent
Dunkley

(10) Patent No.: US 7,854,013 B2
(45) Date of Patent: Dec. 14, 2010

(54) METHOD FOR ELECTRONIC DATA AND SIGNATURE COLLECTION, AND SYSTEM

(75) Inventor: Donnovan George Dunkley, Washington, DC (US)

(73) Assignee: Working Solutions International, Inc., Washington, DC (US)

( * ) Notice: Subject to any disclaimer, the term of this patent is extended or adjusted under 35 U.S.C. 154(b) by 1141 days.

(21) Appl. No.: 11/444,499

(22) Filed: Jun. 1, 2006

(65) Prior Publication Data

US 2006/0288222 A1    Dec. 21, 2006

Related U.S. Application Data

(60) Provisional application No. 60/687,354, filed on Jun. 3, 2005.

(51) Int. Cl.
*G06F 21/22* (2006.01)
(52) U.S. Cl. .................. 726/30; 726/29; 713/170; 713/176
(58) Field of Classification Search .............. 705/51; 713/170, 176; 726/29, 30
See application file for complete search history.

(56) References Cited

U.S. PATENT DOCUMENTS

| 5,634,064 A | 5/1997 | Warnock et al. ............. 395/774 |
| 5,640,577 A | 6/1997 | Scharmer ..................... 715/507 |
| 5,708,806 A | 1/1998 | DeRose et al. ............... 395/615 |
| 5,819,301 A | 10/1998 | Rowe et al. .................. 707/513 |
| 5,915,024 A | 6/1999 | Kitaori et al. ................ 713/176 |
| 6,064,751 A | 5/2000 | Smithies et al. ............. 382/115 |
| 6,091,835 A | 7/2000 | Smithies et al. ............. 382/115 |
| 6,158,003 A | 12/2000 | Kara ........................... 713/168 |
| 6,237,096 B1 | 5/2001 | Bisbee et al. ................ 713/178 |
| 6,268,788 B1 | 7/2001 | Gray ............................ 340/5.2 |
| 6,297,891 B1 | 10/2001 | Kara ........................... 358/405 |
| 6,341,349 B1 | 1/2002 | Takaragi et al. ............. 713/168 |
| 6,401,206 B1 | 6/2002 | Khan et al. .................. 713/176 |
| 6,460,042 B1 | 10/2002 | Hitchcock et al. ............ 707/10 |
| 6,490,601 B1 | 12/2002 | Markus et al. ............... 707/507 |
| 6,499,104 B1 | 12/2002 | Joux ........................... 713/176 |
| 6,535,978 B1 | 3/2003 | Padgett et al. ............... 713/156 |
| 6,594,405 B1 | 7/2003 | Flannery ..................... 382/302 |
| 6,631,200 B1 | 10/2003 | Savoray et al. .............. 382/119 |
| 6,671,805 B1 | 12/2003 | Brown et al. ................ 713/176 |
| 2006/0070126 A1* | 3/2006 | Grynberg ..................... 726/22 |

* cited by examiner

*Primary Examiner*—Matthew B Smithers
*Assistant Examiner*—Paul Callahan
(74) *Attorney, Agent, or Firm*—Winston & Strawn LLP

(57) ABSTRACT

The present teachings provide a computer-implemented data-collection method that can comprise displaying a returnable-form, and the form can comprise a plurality of field associations. The form can comprise a form identification value and/or a form return address, and each field association can comprise a field name and a field value. The method can comprise collecting at least one value entered into at least one respective field value of the field associations, saving the at least one value and the returnable form into a transmit unit, and transferring the transmit unit to the form return address. The method can comprise extracting and processing the field associations saved in the transmit unit. A system to carry out the method is also provided.

20 Claims, 7 Drawing Sheets

Please enter your basic information below. You can use this data to populate future forms. To do so, simply press the POPULATE button on the top of the screen.

| Prefix | First | Middle | Last | Suffix |
|---|---|---|---|---|
| ▓ ▼ | Jack | Z | Roach | Jr. ▼ |

| Social Security Number | Date of Birth (mm,dd,yyyy) | | | Gender |
|---|---|---|---|---|
| 111223333 | 3 ▼ | 3 ▼ | 1938 ▼ | Male ▼ |

| Race/Nat'l Origin: | Marital Status | Number of Children |
|---|---|---|
| Black, Not of Hispanic Origin ▼ | Single ▼ | 3 |

— 240

HOME

| Address Line 1 | Address Line 2 |
|---|---|
| 1515 Wilson Lane | Suite 300 |

| City | State | Zip |
|---|---|---|
| Storybook | OH ▼ | 22334 |

| County | Phone | | Fax | |
|---|---|---|---|---|
| Wyandotte | 402 | 555-1212 | 403 | 555-1213 |

| Country | Email |
|---|---|
| USA | jzr@aol.com |

WORK

| Title | Company |
|---|---|
| President | Roach Cadillac |

| Address Line 1 | Address Line 2 |
|---|---|
| 123 State Line Road | |

| City | State | Zip |
|---|---|---|
| Kansas City | MO ▼ | 66404 |

| Phone | | Fax | | Email |
|---|---|---|---|---|
| 913 | 555-1212 | 913 | 555-1414 | jack@roach.com |

SAVE    CLOSE

FIG. 11

METHOD FOR ELECTRONIC DATA AND SIGNATURE COLLECTION, AND SYSTEM

CROSS-REFERENCE TO OTHER APPLICATIONS

This application claims the benefit of U.S. Provisional Application No. 60/687,354, filed on Jun. 3, 2005, the entire disclosure of which is expressly incorporated herein by reference.

FIELD

The present teachings relate to data collection from distributed data sources using forms. It allows for paperless data collection in an organization, for example, an office.

SUMMARY OF THE INVENTION

According to various embodiments, the present teachings provide a computer-implemented data-collection method. The method can comprise displaying a returnable-form and the form can comprise a plurality of field associations. The form can comprise a form identification value and/or a form return address, and each field association can comprise a field name and a field value. The method can comprise collecting at least one value entered into at least one respective field value of the field associations. The method can comprise saving the at least one value and the returnable form into a transmit unit, and can comprise transferring the transmit unit to the form return address. The method can comprise extracting the field associations saved in the transmit unit. The method can comprise processing the extracted field associations based on at least one field value of the field associations.

According to various embodiments, the present teachings provide a system comprising a first computer, a second computer, and a transfer system. The first computer can comprise a processor adapted to execute a data entry application for a returnable form comprising field associations. Each field association can comprise a field name and a field value. The processor can receive and display the returnable form, receive field values, display user inputs, and save user inputs with at least a portion of the returnable form in a transmit unit. The second computer can comprise a processor adapted to execute a form-processing application for extracting field values from the transmit unit. The transfer system can be adapted to transfer the transmit unit from the first computer to the second computer.

BRIEF DESCRIPTION OF THE DRAWINGS

Various embodiments of the present teachings are exemplified in the accompanying drawings. The teachings are not limited to the embodiments depicted in the drawings, and include equivalent structures and methods as set forth in the following description and as would be known to those of ordinary skill in the art in view of the present teachings. In the drawings:

FIG. 11 is a screen capture of a form reader illustrating a redundant field form;

It is to be understood that both the foregoing general description and the following detailed description are exemplary and explanatory only and are intended to provide a further explanation of the present invention, as claimed.

DETAILED DESCRIPTION OF THE PRESENT INVENTION

The present teachings relate to a method, a system and a collection of computer programs that can perform data collection from distributed data sources using electronic forms. Methods for paperless data collection in an organization, for example, an office, are provided. Data can be collected without paper internally in the organization or externally to the organization. Costs, turnaround time, and reliability of data can be improved. Data validation and data integrity can be improved. The teachings can reduce a need for staff and/or consultants. A form herein can be known as a returnable form or as an electronic form.

A returnable form is a returnable document that bridges the gap between a portable document, a word processing document, and an online database form. The returnable form can present and print information like a portable document. The returnable form can retain data like a word-processing document. The returnable form can transfer its contents into a database like an online form. Once created, a Returnable Form can be distributed, read, filled, and completed on a general-purpose computer. A returnable form can collect data and return the data to the returnable form's disseminators for automated processing. The automated processing can eliminate a data entry step or process by or for the disseminator.

A Form Processor can be used by a returnable form disseminator to process returned forms. The form processor can extract field values from a returnable form. The form processor can create a record in a database using the extracted field value. A database can be a relational database, for example, a Microsoft Access database. The form processor can perform several additional functions, for example, email notification, file transfer; data conversion, emailing of the form, form routing, and operations to be determined by at least one field value in the returnable form. The form processor can comprise a workflow engine.

According to various embodiments, a system can comprise a form designer, a form reader, and a form processor. The form processor can interface with a workflow engine, for example, to generate and manage events generated, for example, by an arrival of a returnable form at a server. The form processor can generate different events by examining a field value in a returned form.

Figures 1, 2:
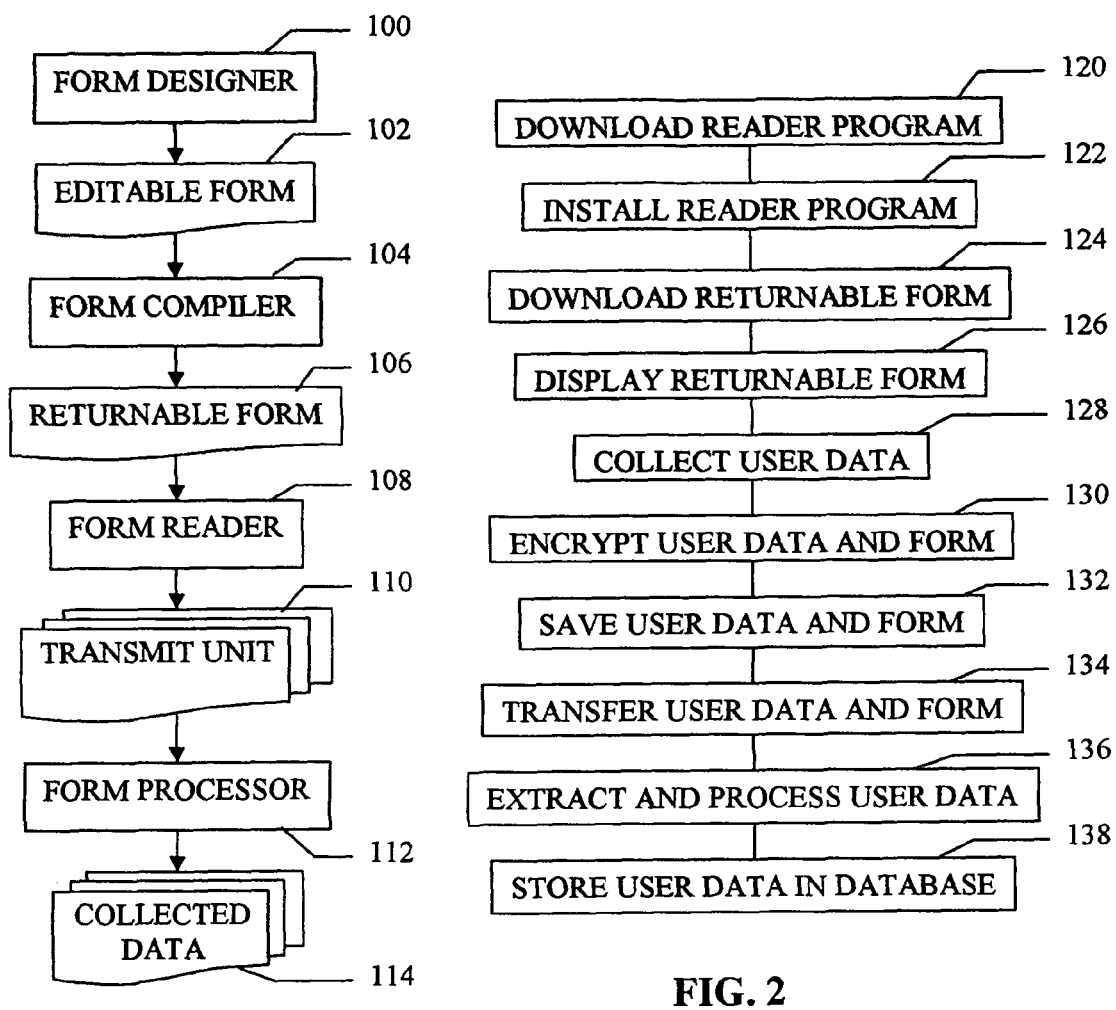
FIG. 1 is an embodiment of a process flow.
FIG. 2 is a flow chart of steps that can be utilized to implement the present teachings.

FIG. 1 is an embodiment of a process flow. A disseminator needing to collect data can use a form designer 100 to compose a returnable form. Form designer 100 can replicate a paper form. In some embodiments, form designer 100 can compose a returnable form without a paper basis. Form designer 100 can generate an editable returnable form 102, for example, in a file having a name with a suffix of ".dsgn".

According to various embodiments, a form compiler 104 can perform field name validations on editable returnable form 102. Form compiler 104 can ensure that the disseminator in form designer 100 has provided necessary parameters for successful data collection. Form compiler 104 can generate a returnable form 106 suitable for distribution to end users, for example, in a file having a name with a suffix of ".rtn".

According to various embodiments, an end user can use a form reader 108 to input necessary fields in returnable form 106. Form reader 108 can provide data input facilities known in the art. When returnable form 106 requires a signature, form reader 108 can assist in electronic signing of returnable form 106. Form reader 108 can validate values of fields entered by an end user in returnable form 106, when returnable form 106 specifies such checks or predicates. While data is being entered into fields of returnable form 106 by an end-user, a value entered or collected by a form field can be saved in a transmit unit 110 that is a composite comprising the value and returnable form 108. Form reader 108 can flag and/or log actions by an end-user in transmit unit 110. For example, form reader 108 can note transmission of transmit unit 110 within a body of transmit unit 110, either prior to or after a successful transmission of transmit unit 110 to a form return address. In some embodiments, form reader 108 can disallow editing of returnable form 106 after a signing of returnable form 106. Form reader 108 can transmit a completed returnable form to a server in a variety of matters. Form reader 108 can control displaying and editing of returnable form 106 once returnable form 106 has been transmitted. Transmit unit 110 can comprise a computer data structure, for example, a file having a name with a suffix of ".rtn".

According to various embodiments, returnable form 106 can be copied and disseminated to end users using any of the network protocols known in the art. In some embodiments, returnable form 106 can be distributed by shipping portable computer media to an end user. The portable computer media can comprise form reader 108 and/or returnable form 106.

According to various embodiments, a form processor 112 can extract field names and field values sent upstream by form reader 106. An exemplary process undertaken by form processor 112 can manipulate collected data 114.

According to various embodiments, the following can be an embodiment of a distribution and execution model for the present teachings. An end user can be provided with a form reader. An end user can download the form reader free from a website, for example, www worksol.biz, or the form reader can be pre-installed on a computer. The computer can be a general-purpose computer, for example, a personal computer, for example, a Windows desktop, a Linux desktop, or a Macintosh desktop. A disseminator can purchase a form designer and a form processor. A returnable form can be designed and made available to a user, for example, over a web site available to the disseminator. The returnable form can transmit a completed form or transmit unit to a form return address, for example, a network address, a URN, a URL, a LAN directory, a postal address, or the like, where the form processor program is executing.

FIG. 2 is a flow chart of steps that can implement the present teachings. When a form reader program is not installed on a desktop computer, an end user can download a reader program 120. After downloading, an end user can install reader program 122 on the computer. An end user can download, or be otherwise provided a returnable form, returnable form 124 and display returnable form 126 on the computer display. As the end user enters values into fields being displayed, the form reader can collect user data 128. Upon receiving an indication from the end user that a transmission of the returnable form and collected data is desired, the reader program can optionally encrypt the input user data and form 130. Further, the reader program can save user data and form 132 onto a storage media on the computer. Either the reader program can initiate a transfer of the user data in the returnable form or instructions in returnable form can be provided to ship a copy of the returnable form to the entity using, for example, a network service or U.S. mail. Once the disseminator of the returnable form receives the user data form a form processor can be used to extract and process user data 136. Various actions can be performed on the user data upon receipt by the server. Examples include storing user data in a database 138, sending e-mails, or other desired functions.

Form Designer

A Form Designer application or program can be provided to create a returnable form. When duplicating or replacing a paper form, an image of the form can be displayed or placed in the background of a computer display. The image can be scanned, bitmapped, pasted, or otherwise placed directly into the form designer. The Designer can provide a drop-and-drag tool set to expedite form design.

Once a layout has been determined, the form designer can provide a data-entry tool set to place check boxes, drop-down boxes, and edit boxes into a form. When duplicating a paper form, the various data entry tool can be placed over or super imposed on a data entry area or a blank area of the paper form.

Figure 3:
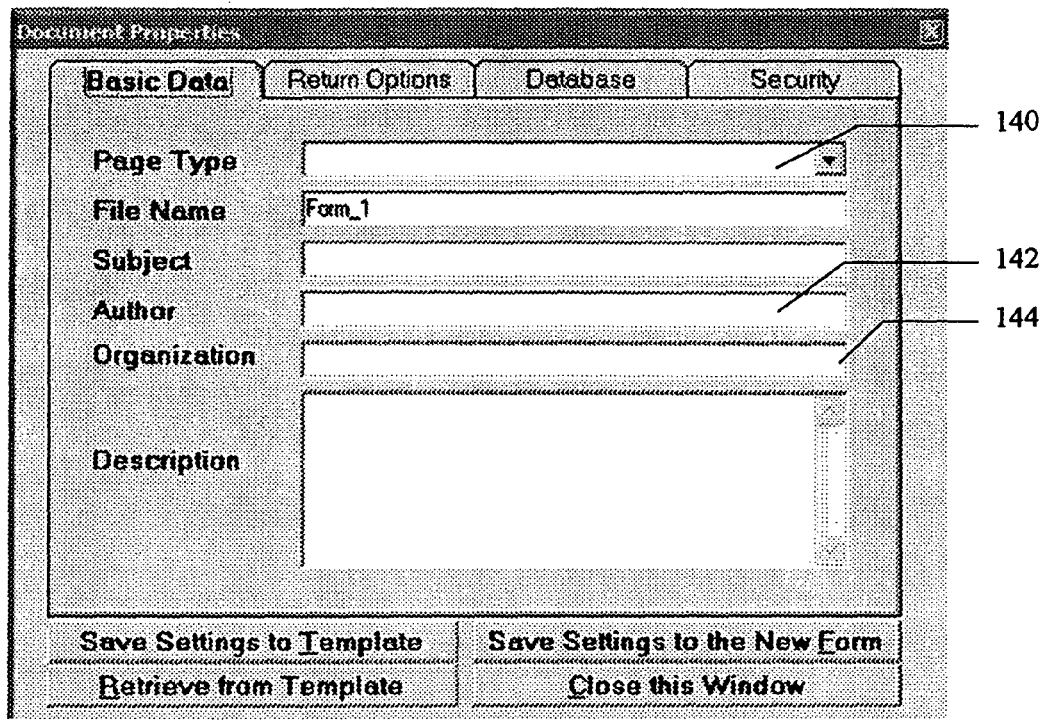
FIG. 3 is an embodiment of a screen in a form designer.

FIG. 3 is a screen capture of a form designer. The disseminator can provide a page type 140, for example, letter, legal, A-4, or tabloid, which can be used to for WYSIWYG applications. A returnable form can also incorporate an author 142 and an organization 144.

Figure 4:
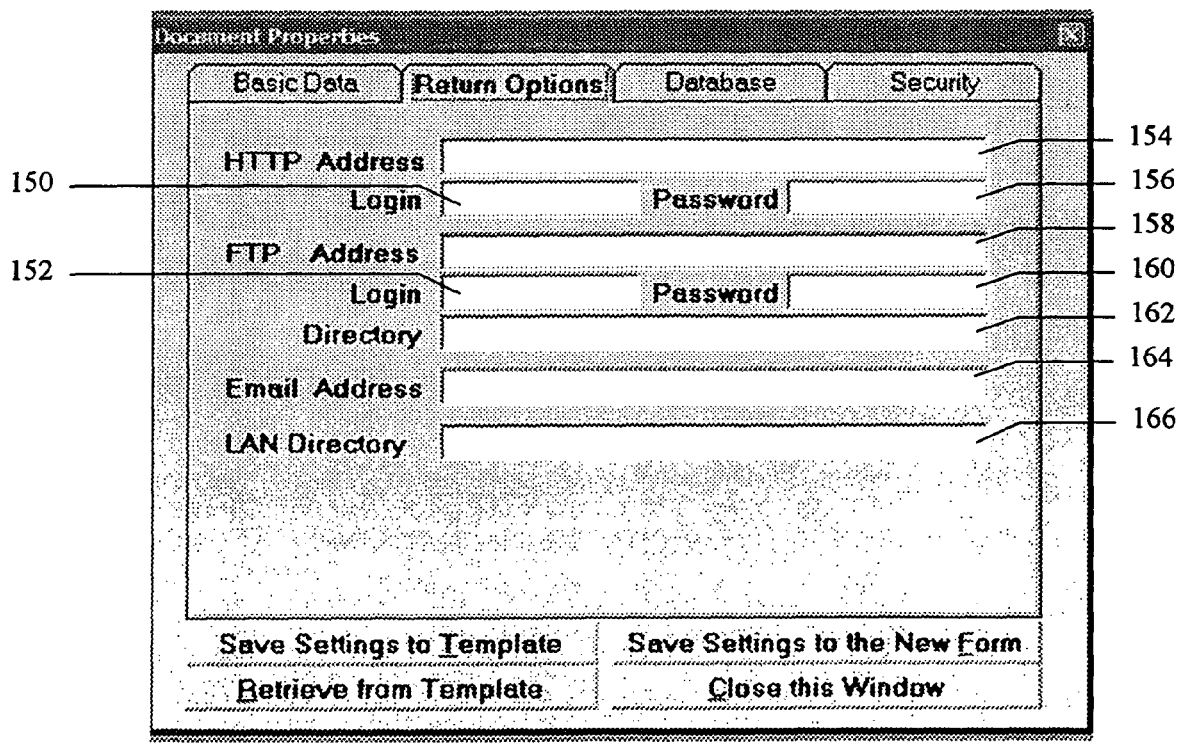
FIG. 4 is a screen shot of a form designer.

FIG. 4 is a screen capture of a form designer. When designing a returnable form various network mechanisms can transfer a completed returnable form. If a hypertext transfer protocol (HTTP) transfer of data is desired, the disseminator can provide an HTTP address 154, optionally an HTTP login 150, and optionally an HTTP password 156. In some embodiments, a disseminator can utilize a file transfer protocol (FTP), optionally an FTP login 152, optionally an FTP password 160, and a directory 162 for saving the returnable form and user data after transferring the file. In some embodiments, a disseminator can provide an e-mail address 164 for a completed returnable form to be returned to. In some embodiments, wherein the end user and the server are on a network sharing a network or LAN directory the form leader can be adapted to return a completed form to a network or LAN directory 166.

Figure 5:
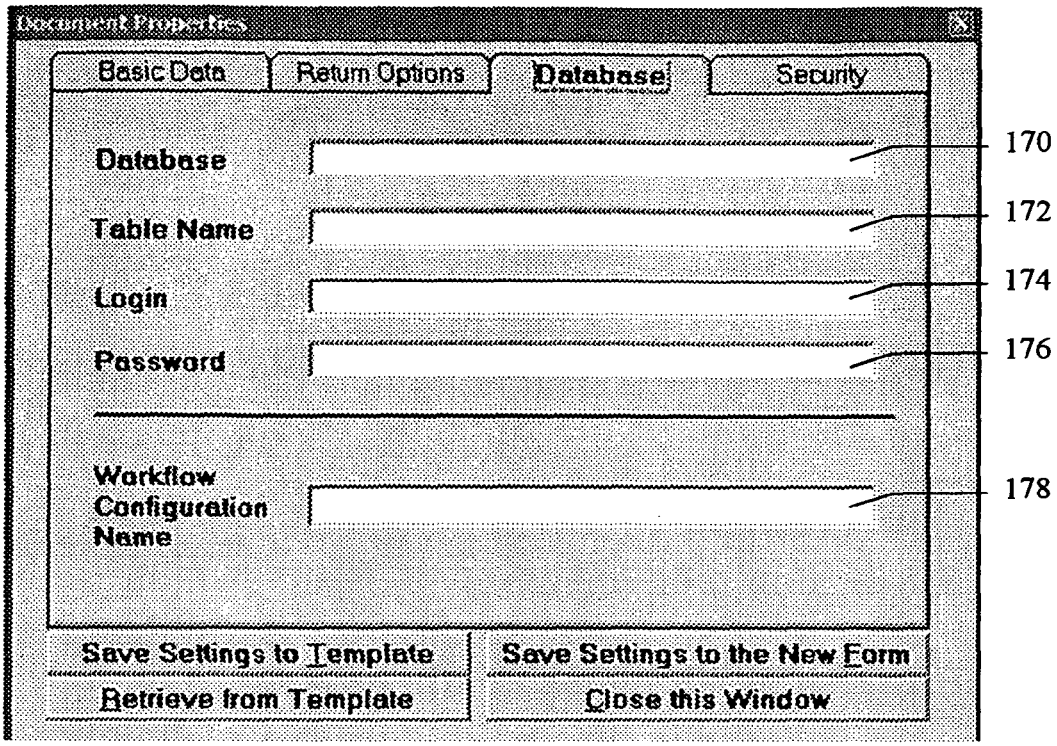
FIG. 5 is a screen capture of a form designer.

FIG. 5 is a screen capture of the form designer gathering parameters for the form processor. A database 170, a table 172, a login 174, and a password 176 can be gathered while a returnable form is being designed. The disseminator can specify a workflow configuration name 178 that can be used by the form processor to execute a script matching the workflow configuration name 178. The script can provide a full set of logic control to the user designing the form. Activities available to the form processor when executing a workflow configuration as specified by the workflow configuration name 178 can be a limited set of operations, an extended set of operations, or as specifically desired by a user designing the form.

Figure 6:
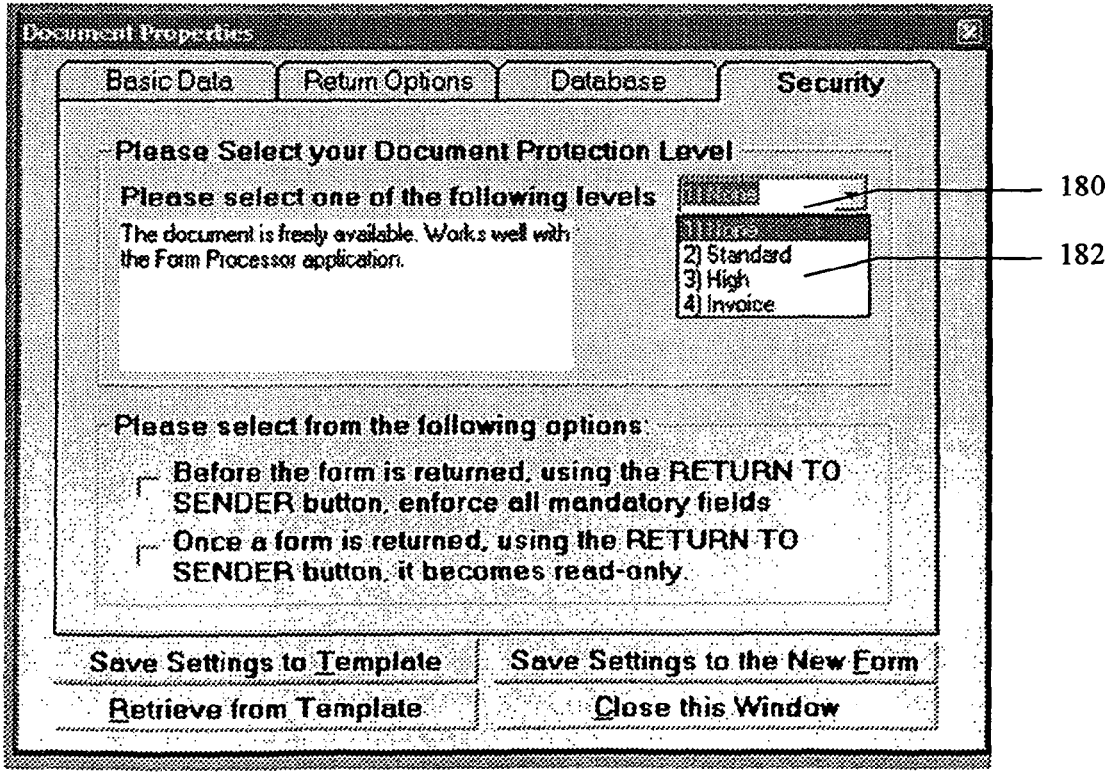
FIG. 6 is a screen capture of a form designer.

FIG. 6 is a screen capture of the form designer. A returnable form can be configured to require a level of security or signature prior to being returned. Various levels of signature requirements, encryption requirements, or both can be specified in, for example, a security level field 180 from the drop-down list 182. The returnable form can be electronically signed by an end-user. In some embodiments, a returnable form can be used to capture signatures, for example, an audio signature, a scanned-in signature, or a signature captured using a data pen.

Document Security Home

All returnable forms can use a two-part encryption system: a separate encryption with a separate key for each page and an overall 128-bit encryption for the entire document. Prior art forms use a single, usually a default key, encryption key. However, a disseminator can create a returnable form with a private key or password. If the disseminator wants to distribute forms that become encrypted only after they are completed, the disseminator can do that also. The latter option is called the "Invoice Option" because it can be ideal for customers who are completing order forms with credit card numbers or other personal information. If the document is intercepted, the double encrypted can be sufficient to render it unusable by an interceptor.

Returnable Forms are also secure in their content. They cannot accept external binary data, so they are not in a position to serve as a carrier for "Trojan Horse" types of programs.

Finally, virus and worm programs thrive in systems that have event-driven scripting languages. Returnable Forms do not provide a scripting language. A returnable form can provide a list of about 20 menu macro commands, all of which can be attached to a push-button widget. As a result, a Returnable Form cannot launch another program, or transfer malicious code when you open it. By design, the command set available for use with a returnable form is limited strictly to matters internal to the form itself, for example, a returnable form can be designed not to use Visual Basic Script, which has been responsible for the majority of virus attacks on a Windows desktop.

Figure 7:
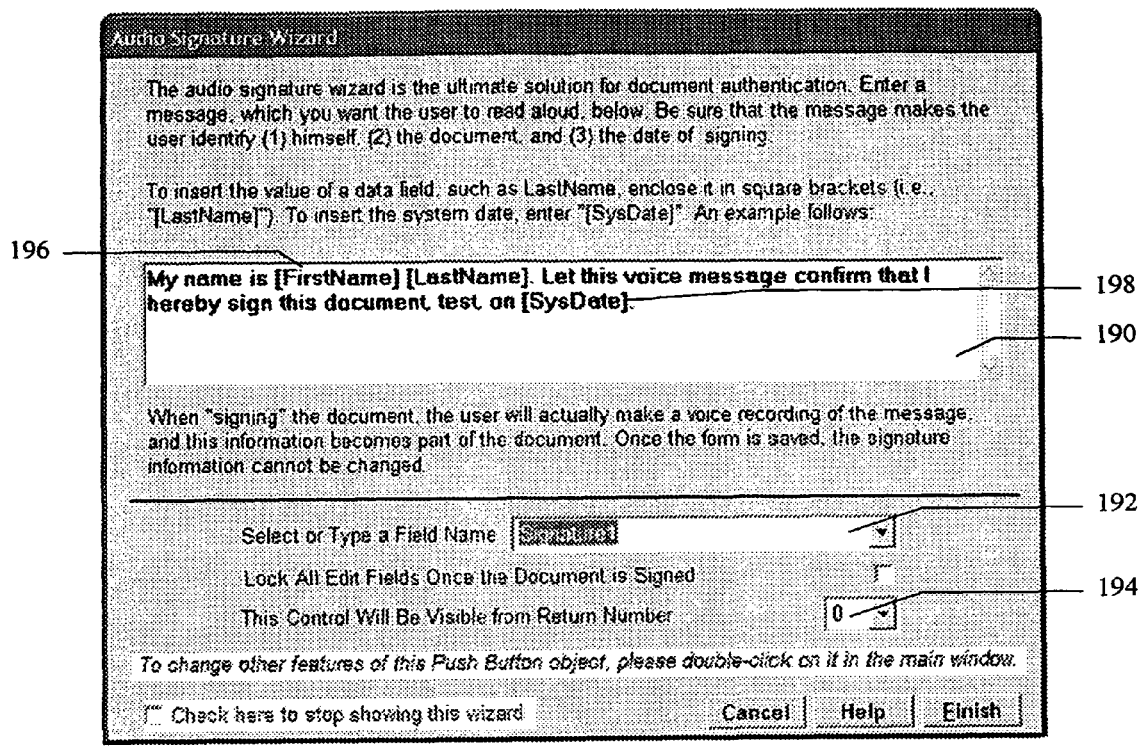
FIG. 7 is a screen capture of a form designer.

FIG. 7 is a screen capture of a form designer screen available to a disseminator designing a returnable form. A text box 190 can be used by the disseminator to provide a variable content, customized, to be vocally recited by an end user. The text specified at text box 190 can comprise variables that can be substituted when a message screen is presented to an end user, for example, a field name 196 can be used to substitute a field value in a text display to the user, or a system field value 198 can be used to provide variable text to the end user. The field name where the recording can be specified in drop down box 192. A control identifier 194 can also be collected from the disseminator.

Figure 8:
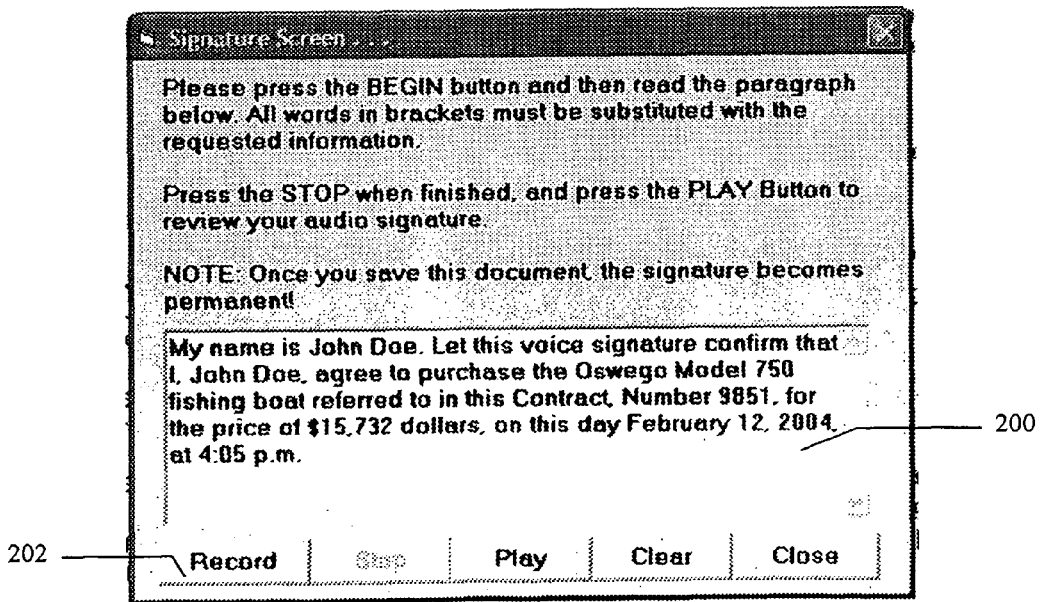
FIG. 8 is a screen capture of a form reader when an end user requests to sign a returnable form.

FIG. 8 is a screen capture of a form reader when an end user requests to sign a returnable form by clicking a push button on a display. A text box 200 can show a variable content message to the end user. When the end user is ready, he or she can begin recording an audio, video, or audio/video recording of their recitation of the text in text box 200 by enabling a recording feature, for example, by clicking on record button 202. The end user can replay the recording by clicking on the play button 204. In some embodiments, the form reader and/or the form processor can be adapted to perform a statistical analysis on whether an end user actually recited the text in text box 200, for example, with a certain level of certainty greater than zero. In some embodiments, a human listening to the recording before allowing further processing of the returnable form can perform validation of a recording.

Figure 9:
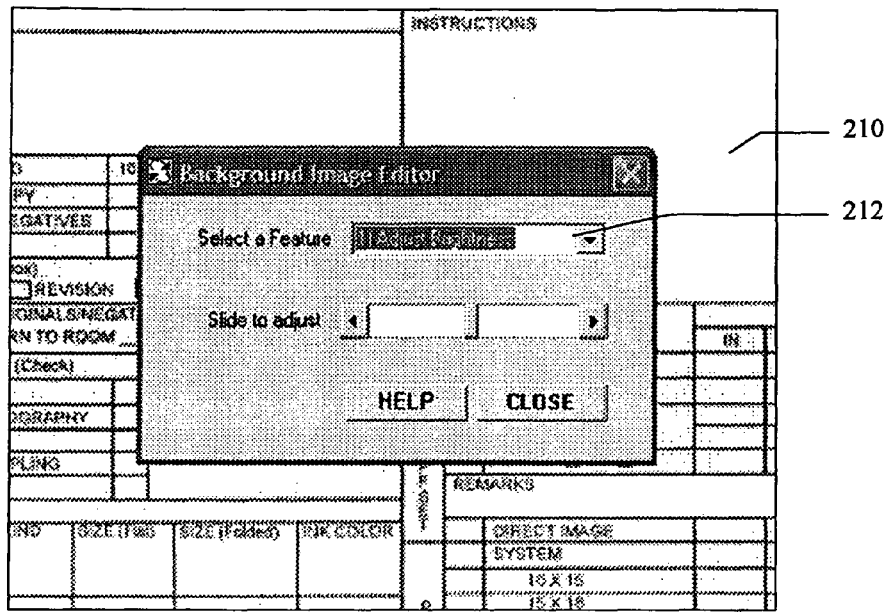
FIG. 9 is a screen capture of a form designer.

FIG. 9 is a screen capture of a form designer where a disseminator has captured an image 210 that can be used as a background. FIG. 9 illustrates an image being manipulated using a background image editor 212.

Figure 10:
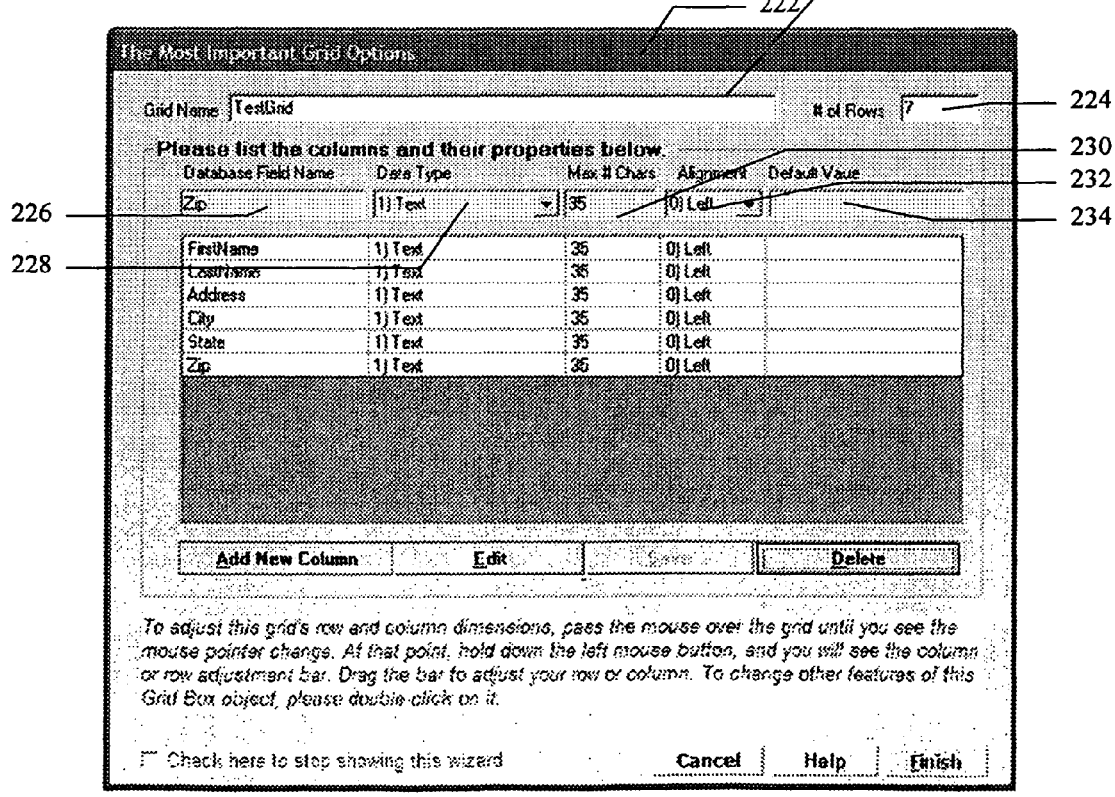
FIG. 10 is a screen capture of a form designer.

FIG. 10 is a screen capture of a form designer. An exemplary set of parameters that can be collected for a grid are displayed singly or in multiple rows of a parent or a child record. The specification listed in a grid screen 222 can be used to create, manage, or manipulate tables in a database. For example, the grid name can be used to name a table in the database, and the database field can specify the column headings in the table. Grid name 220 and a number of rows 224 to be displayed on a returnable form can be collected by a form designer. A database field name 226, a data type 228, a maximum number of characters 230, an alignment field 232, and a default value 234 can be specified in the form designer by a disseminator.

FIG. 11 is a screen capture of a form reader illustrating a redundant field form. A form reader program can populate redundant data fields in and/or across returnable forms. When a returnable form is designed, using a standard set of field names, the redundant data module can populate similarly named fields in a returnable form, for example, by command or upon opening a returnable form for an end user. Screen 240 depicts an exemplary list of fields that can be collected as part of a redundant data gathering operation.

Figure 12:
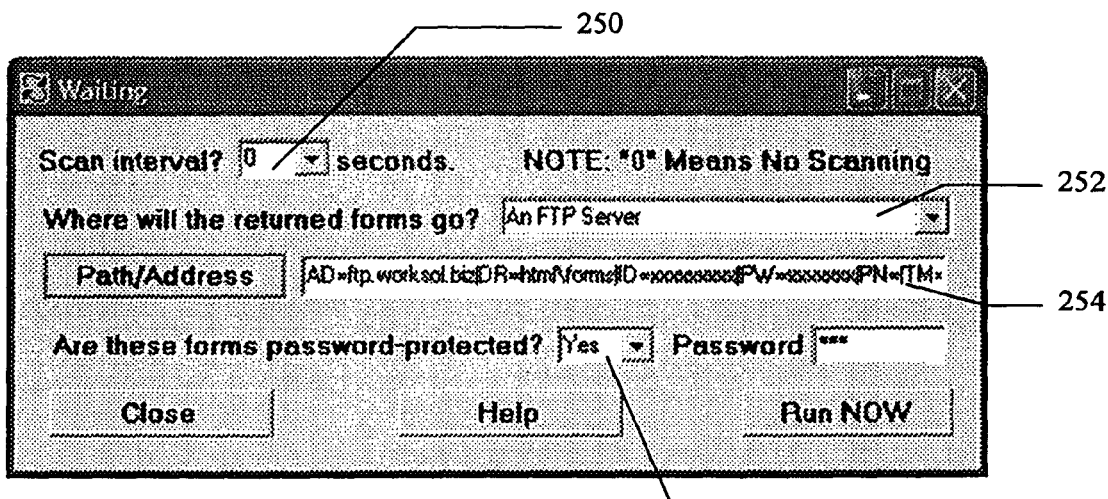
FIG. 12 is a screen capture of a form processor.

FIG. 12 is a screen capture of a form processor. A scan interval 250 can be specified to control how often a directory is scanned for arrival of returnable forms. Various operation fields can be specified.

Figure 13:
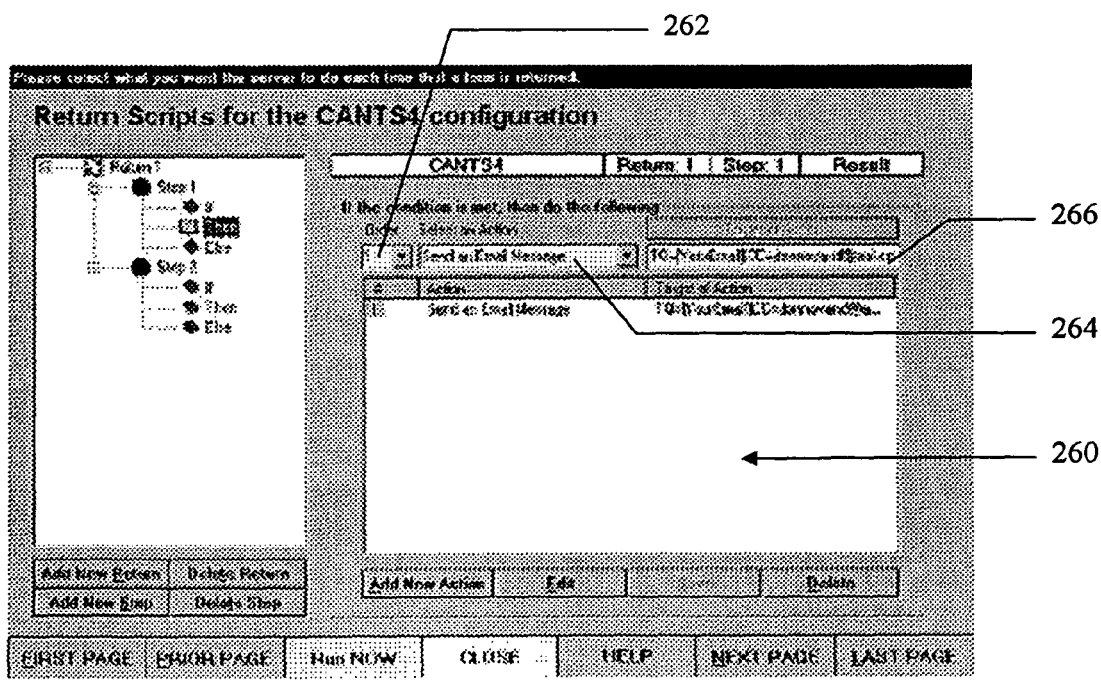
FIG. 13 is a screen capture of a form processor.

FIG. 13 is a screen capture of a form processor that can manage return scripts using the screen 260. An order of execution 262 can be specified for the return scripts. Actions to be invoked for a returnable form event can be provided in drop-down box listing action 264. A parameter value 266 can be specified to the form processor.

According to various embodiments, the Reader has the layout of a web browser, complete with forward-back buttons and an address slot. This layout was chosen because people are accustomed to it, thus minimizing training time. The reader can use a browser, for example, Internet Explorer, in order that users can retrieve Returnable Forms that are posted on web pages.

Once the reader displays a form, the entire form is resident on the user's computer and user need not maintain an internet connection. This feature can be very helpful for long forms, such as college applications.

Users can complete their Returnable Forms rapidly because they can save redundant data. The Reader has a special feature, where users can save their basic data, such as name and address, which they use from one form to the next. With this data stored, users can populate the most common fields in their forms simply by selecting the Populate Redundant Fields item on their menu bar.

To finish the form, users "sign" it by recording a unique statement of intent, in their own voice, and the reader embeds it into the document. Users return the form by pressing the Return to Sender button, which sends a copy of the form in the manner specified in the form.

When a user needs a paper copy of the form, he can print it. Unlike HTML—or even word processor formats, an RTN document is designed around defined page specifications, and the designer can control every pixel on a page. Printing is 100% What You See Is What you Get (WYSIWYG), and text cannot overrun the boundaries of a page.

Form Processor Module

This module can automatically place a Returnable Form's data into a database, for example, a Microsoft Access 2000 database. When a database specified by the form does not exist, this module can create one upon receipt of the form. When tables specified in the form do not exist, then the module can create the tables. Finally, when a table does not comprise all the fields specified a form, this module will modify the table definition.

Workflow Engine Module

Workflow is the predetermined movement of a document from one place to another, once an action is performed upon it; and a workflow engine is the agent of that movement. This workflow engine is made to work exclusively with Returnable Form (rtn) files; however, it is very flexible within this context.

The Returnable Forms workflow system is based on the number of times that a Returnable Form is returned to the Workflow Engine. When a form is designed and initially distributed, it carries a return number of "0." Once the user presses the "Return to Sender" button, the return number goes up by one.

The Workflow Engine refers to this configuration name to determine how the form should be treated when it is returned (i.e., when the file is transmitted back to its home server). If you use the workflow engine to sequentially redistribute a form, it may be returned several times before coming to the end of its contact or life cycle. Each return can be associated with its own individual script, and the workflow engine keeps track of the returns by incrementing the number in the document header. The workflow engine can use a graphical interface. The script can provide a graphical interface.

In the workflow engine, scripts can be used to for many varied actions, for example, to transfer forms, insert their contents into databases or send emails. These actions can be taken automatically or in response to the existence of certain conditions, such as the passing of a deadline or a field value or answer to a question returned in the transmit unit of the returnable form. In short, if properly utilized, the Returnable Forms Workflow Engine can increase productivity by responding to mindless clerical tasks and maximizing an organization's productivity.

Signing a Returnable Form Home

The audio signature feature is a breakthrough in document authentication technology. It can use an end-user's voice, in a unique context, as the basis for document authentication. With this system, one can uniquely identify a document in a way that is difficult to copy and in a manner that is convincing to anyone who needs to verify this digital signature.

When an end-user completes a returnable form, they can activate or click on a button on the form, which presents a dialog box. The dialog box contains a customized message for the end user, such as the one shown in FIG. 8. The message can comprise an end-user's name, document identification, a date, the time, and a statement of intent to sign this document. The end-user can record the message in his or her own voice and press the STOP button when finished. When the document is saved, the binary data of the recording can become embedded in the document, and cannot be removed. In addition, a message on the display can indicate that a signature has been made. From this point on, anyone who seeks to verify this signature can use the play control to hear the recording.

Using this system, users can uniquely identify a document in a way that is very difficult to copy and then a manner that is very convincing to anyone who needs to verify this digital signature. The system embeds a digital recording of the user's voice into the document. Once embedded, this signature cannot be removed and the document is encrypted. However, even if this signature can be removed and inserted into another document, the signature, or voice recording, identifies the time, the date, the place, and the document itself, which makes the identification useless in another context.

Step 1: Design a Returnable Form

A disseminator can design a returnable form from scratch by either scanning it from paper, or by importing images made by non-returnable form viewers. The graphical user interface operates in a very predictable way (drop and drag). Wizards can guide a disseminator through any parts requiring special attention.

Step 2: Distribute a Form

A disseminator can distribute a returnable form by either email or posting on a website with confidence because the form uses a two-part encryption system. Encryption is password-based, and password protection can be set to commence after a document has been signed and saved.

Step 3: Data Entry

Users download the form and complete it with the Form Reader. When a user needs the Form Reader, the user can download it from a website. A user can save his common data in a special form in the Reader. A user can populate many fields in this form or other forms simply by selecting the Populate Redundant Fields item on their menu bar. To finish the form, the user can "sign" the form by, for example recording a unique statement of intent, in their own voice. The Form Reader embeds into the form, and the user can return the form by pressing the Return to Sender button, which sends a copy of it back to the disseminator, for example, to a FTP server, a web-server, or other networked computers.

Step 4a: Form Processing

Once the form is returned, the Form Processor on the server, for example, a disseminator's server, can extract the data and store the data into a database, for example, a Microsoft Access database. The processing can create databases, tables and fields as necessary.

Step 4b: Form Workflow Processing

Alternatively, a Returnable Forms Workflow Engine can be utilized to process a returned form. This processing can include, but is not limited to, putting the form's data values into an ODBC-compliant database, or sending the returned to another user, or rendering the returned form in XML format and sent to another process. The Workflow Engine can react to answer values returned in form and alter it's processing accordingly. The workflow engine is programmable, so that a document's workflow path can be determined quickly.

According to various embodiments, the present teachings provide a computer-implemented data-collection method. The method can comprise displaying a returnable-form and the form can comprise a plurality of field associations. The form can comprise a form identification value and/or a form return address, and each field association can comprise a field name and a field value. The method can comprise collecting at least one value entered into at least one respective field value of the field associations. The method can comprise saving the at least one value and the returnable form into a transmit unit, and can comprise transferring the transmit unit to the form return address. The method can comprise extracting the field associations saved in the transmit unit. The method can comprise processing the extracted field associations based on at least one field value of the field associations.

According to various embodiments, the present teachings provide a computer-implemented data-collection method according to any of the embodiments described above wherein the returnable form can further comprise at least one data element that comprises at least one of a page structure, a background image, an author name, a database name, a first table name, a second table name, a protection level, and a security level.

According to various embodiments, the present teachings provide a computer-implemented data-collection method according to any of the embodiments described above wherein the plurality of fluid associations comprises at least one parent record and a plurality of child records and the collecting comprises collecting one parent record and a plurality of child records in the respective field associations. The collecting step can comprise collecting a count of child records and the number of records can vary and be customized, as desired. The collecting can comprise data entry, for example, by typing, by cutting and pasting, by scanning, or the like.

According to various embodiments, the present teachings provide a computer-implemented data-collection method according to any of the embodiments described above wherein the transmit unit can comprise at least one of a machine identifier, an end-user identifier, a signature timestamp, a return timestamp, a processor serial number, a network address, and a Media Access Control (MAC) address. The method can comprise encrypting the returnable form with a first key and encrypting the at least one value with a second key. The method can comprise computing the first key or the second key such that the first key or the second key are dependent on at least a portion of the transmit unit.

According to various embodiments, the present teachings provide a computer-implemented data-collection method according to any of the embodiments described above wherein the collecting can comprise making a recording comprising audio data, video data, or audio-video data, and the saving can comprise saving the recording as at least one value.

According to various embodiments, the present teachings provide a computer-implemented data-collection method according to any of the embodiments described above, that can further comprise at least one of displaying an image of a preprinted form in a background of the returnable form, printing the returnable form, saving the returnable form in an incomplete stage prior to completing said collecting, locking the returnable form to disallow the collecting, installing a computer program adapted to implement the method, and downloading a computer program adapted to implement the method.

According to various embodiments, the present teachings provide a computer-implemented data-collection method according to any of the embodiments described above that can further comprise obtaining an image of a preprinted form comprising a data entry portion, displaying the image, superimposing a data entry control over the data entry portion, and saving the image and the data entry control to form the returnable form.

According to various embodiments, the present teachings provide a computer-implemented data-collection method according to any of the embodiments described above wherein transmit unit can comprise a file and the transferring can comprise establishing a connection with the form return address, transmitting the transmit unit to the form return address, and saving the transmit unit.

According to various embodiments, the present teachings provide a computer-implemented data-collection method according to any of the embodiments described above wherein the transferring can comprise composing an e-mail comprising the transmit unit and transmitting the e-mail to the form return address.

According to various embodiments, the present teachings provide a computer-implemented data-collection method according to any of the embodiments described above wherein the transmit unit can comprise a file and the transferring can comprise saving the transmit unit to a portable computer media, shipping the portable computer media to the form return address, and reading the transmit unit from the portable computer media at a server.

According to various embodiments, the present teachings provide a computer-implemented data-collection method according to any of the embodiments described above wherein the extracting and processing can comprise at least one of creating a database and creating a table comprising columns specified by at least one of the plurality of fields associations.

According to various embodiments, the present teachings provide a computer-implemented data-collection method according to any of the embodiments described above wherein the extracting and processing can comprise creating a database record comprising values specified by at least one of the plurality of fields associations. The extracting and processing can comprise creating a plurality of database records comprising values specified by at least one of the plurality of fields associations. The extracting and processing can comprise conditionally executing a computer program based on the form identification value. The extracting and processing can comprise conditionally executing a computer program based on at least one field value.

According to various embodiments, the present teachings provide a computer-implemented data-collection method according to any of the embodiments described above wherein the displaying can comprise displaying a What-You-See Is What You Get (WYSIWYG) version of the returnable form.

According to various embodiments, the present teachings provide a program storage medium readable by an information handling system, the program storage medium embodying a program of instructions executable by the information handling system and adapted to perform the any of the computer-implemented data-collection methods described above.

According to various embodiments, the present teachings provide a system comprising a first computer, a second computer, and a transfer system. The first computer can comprise a processor adapted to execute a data entry application for a returnable form comprising field associations. Each field association can comprise a field name and a field value. The processor can receive and display the returnable form, receive field values, display user inputs, and save user inputs with at least a portion of the returnable form in a transmit unit. The second computer can comprise a processor adapted to execute a form-processing application for extracting field values from the transmit unit. The transfer system can be adapted to transfer the transmit unit from the first computer to the second computer.

According to various embodiments, the present teachings provide a system according to any of the embodiments described above wherein the returnable form can further comprise at least one data element that can comprise at least one of a page structure, a background image, an author name, a database name, a first table name, a second table name, a protection level, and a security level.

According to various embodiments, the present teachings provide a system according to any of the embodiments described above wherein the plurality of fluid associations can comprise at least one parent record and a plurality of child records and the data entry application can be adapted to receive one parent record and a plurality of child records in the respective field associations.

According to various embodiments, the present teachings provide a system according to any of the embodiments described above wherein the data entry application can be adapted to receive a count of child records that can be changed, as desired. The count of child records can be variable, for example, updatable.

According to various embodiments, the present teachings provide a system according to any of the embodiments described above wherein the transmit unit can comprise at least one of a machine identifier, an end-user identifier, a signature timestamp, a return timestamp, a processor serial number, a network address, and a Media Access Control (MAC) address.

According to various embodiments, the present teachings provide a system according to any of the embodiments described above that can further comprise a first encryption device adapted to encrypt the returnable form with a first key, and a second encryption device adapted to encrypt the at least one value with a second key. The system can further comprise a computing device adapted to compute the first key or the second key such that the first key or the second key are dependent on at least a portion of the transmit unit.

According to various embodiments, the present teachings provide a system according to any of the embodiments described above that can further comprise a form design application adapted to obtain an image of a preprinted form comprising a data entry portion, display the image, superimpose a data entry control over the data entry portion, and save the image and the data entry control to form the returnable form.

According to various embodiments, the present teachings provide a system according to any of the embodiments described above wherein the transmit unit can comprise a file and the transfer system can be adapted to establish a connection with the form return address, transmit the transmit unit to the form return address, and save the transmit unit.

According to various embodiments, the present teachings provide a system according to any of the embodiments described above wherein the form-processing application can be adapted to create a database record comprising values specified by at least one of the plurality of fields associations. The form-processing application can be adapted to create a plurality of database records comprising values specified by at least one of the plurality of fields associations. The form-processing application can be adapted to conditionally execute a computer program based on the form identification value. The form-processing application can be adapted to conditionally execute a computer program based on at least one field value.

EXAMPLES

A small business owner can use a Returnable Form to make. The same form can be used over the internet or in a point-of-sale device. A manager in a small, medium, or -large company can use a Returnable Form as a low-cost alternative to form automation.

An administrator or clerk can create, disseminate, and process returnable forms easily. Data can be easily organized, collected and assembled. A disseminator does not need to know how to make a database, as the system can automatically create a database.

A non-profit organization or an elected official can use a returnable form to conduct polls, for example, instant polls, of members or constituents. When you poll with a Returnable Form, results can be easily tallied. A government agency manager can meet the continuing demand to do more with less without controversy. A Returnable Form system can be cheap to acquire, implement, and maintain. Benefits can include the following:

Easy to use
Quick to implement
Flexible
Secure
Low maintenance
Not exotic

Forms can be printed when required, for example, if regulations still require paper No big changes are forced on the current IT infrastructure.

An admissions officer at a university can eliminate countless hours from the admissions process with a Returnable Form system. In addition to saving student application data into a database, the returnable form system can enable the admissions officer to move the application automatically from one review station to another. The system can be programmed to react to data collected from the form. For example, if a university must reject applicants who fail to meet certain criteria and must accept applicants who do meet certain criteria, then the system can perform initial screenings on the applications and send the appropriate notifications.

The entity can be an organization or individual that desires to collect data. Examples of an entity are a college or university, a business, a marketing firm, an association, an employment agency, a government agency or department. That kind of forms is designed available can for example include a resume, an employment application, a survey form, or a poll. The returnable form and data can be distributed for example on a portable computer media, for example, a CD-ROM, a floppy, a memory chip, or a network. The entity can define a design on the returnable form and make it available to an end user. For example, a human resources department for an entity can provide a job application to an end user in returnable form where after data entry by an end user, the human resources department can in an automated fashion enter the data entered by the end user into their databases.

The goal of the Returnable Forms system is less about changing how people work and more about helping people work faster.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A computer-implemented data-collection method comprising:
   displaying a returnable-form comprising a plurality of field associations, a form identification value, and a faun return address, wherein each field association comprises a field name and a field value;
   collecting at least one value entered into at least one respective field value of the field associations;
   saving the at least one value and the returnable form into a transmit unit;
   transferring the transmit unit to the form return address
   extracting the field associations saved in the transmit unit;
   processing the extracted field associations based on at least one field value of the field associations;
   encrypting the returnable form with a first key; and
   encrypting the at least one value with a second key.

2. The method of claim 1, wherein the returnable form further comprises at least one data element that comprises a database name, a first table name, and a second table name.

3. The method of claim 1, wherein the plurality of field associations comprises at least one parent record and a plurality of child records and the collecting comprises collecting one parent record and a plurality of child records in the respective field associations.

4. The method of claim 3, wherein the collecting comprises a variable count of child records.

5. The method of claim 1, wherein the transmit unit comprises a machine identifier identifying a machine of which the transmit unit are saved and a signature associated with the saving.

6. The method of claim 1, further comprising populating a first field value with a second field value, wherein a first field name associated with the first value is similar to a second field name associated with the second value.

7. The method of claim 1 further comprising encrypting the returnable form after the saving of the transmit unit.

8. The method of claim 1, further comprising computing the first key or the second key such that the first key or the second key are dependent on at least a portion of the transmit unit.

9. The method of claim 1, wherein the collecting comprises making a recording comprising audio data, video data, or audio-video data, and said saving comprises saving the recording as at least one value.

10. The method of claim 1, further comprising:
   obtaining an image of a preprinted form comprising a data entry portion;
   displaying the image;
   super-imposing a data entry control over the data entry portion; and
   saving the image and the data entry control to provide the returnable form.

11. The method of claim 1, wherein the transmit unit comprises a file and said transferring comprises establishing a connection with the form return address, transmitting the transmit unit to the form return address, and saving the transmit unit.

12. The method of claim 1, wherein the transferring comprises composing an e-mail comprising the transmit unit and transmitting the e-mail to the form return address.

13. The method of claim 1, wherein the extracting and processing comprises at least one of creating a database and creating a table comprising columns specified by at least one of the plurality of fields associations.

14. The method of claim 1, wherein the processing comprises creating a database record comprising values specified by at least one of the plurality of fields associations.

15. The method of claim 1, wherein the processing comprises creating a plurality of database records comprising values specified by at least one of the plurality of fields associations.

16. The method of claim 1, wherein the processing comprises conditionally executing a computer program based on the form identification value.

17. The method of claim 1, wherein the processing comprises conditionally executing a computer program based on at least one field value.

18. The method of claim 1, wherein the saving, the transferring, the extracting, and the processing steps do not require human intervention.

19. A system, comprising:
   a first computer comprising a processor adapted to execute a data entry application for a returnable form comprising field associations, wherein the processor is adapted to receive and display the returnable form, receive field values, display user inputs, and save user inputs with at least a portion of the returnable form in a transmit unit, and each field association comprises a field name and a field value;
   a second computer comprising a processor adapted to execute a form-processing application for extracting and processing the field associations from the transmit unit; and
   a transfer system adapted to transfer the transmit unit from the first computer to the second computer;
   a first encryption device adapted to encrypt the returnable form with a first key; and
   a second encryption device adapted to encrypt the at least one value with a second key.

20. The system of claim 19, wherein the plurality of field associations comprises at least one parent record and a plurality of child records and the data entry application is adapted to receive one parent record and a plurality of child records in the respective field associations.

* * * * *